(No Model.) 2 Sheets—Sheet 2.
J. B. BROOKS.
CYCLE SADDLE ATTACHMENT BOSS.
No. 575,631. Patented Jan. 19, 1897.
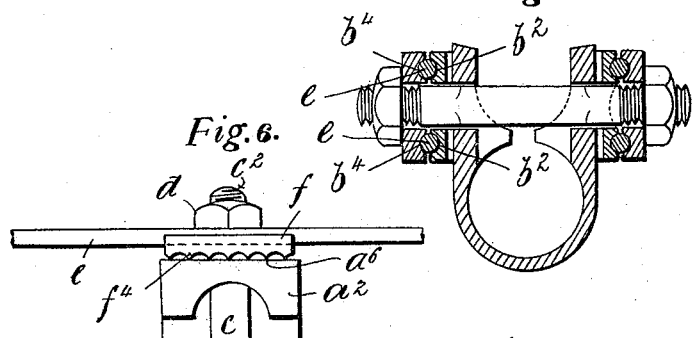
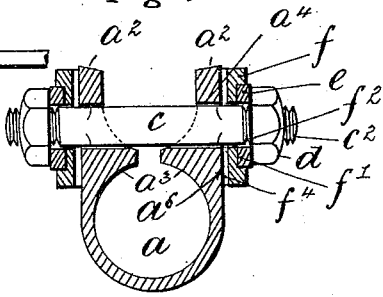
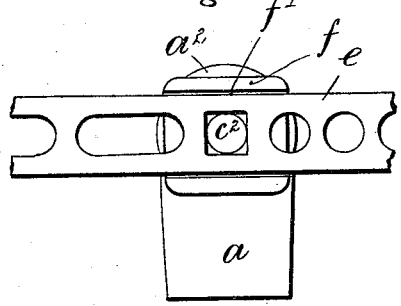
WITNESSES
Thos. A. Gunn
Robt Everett
INVENTOR
John B. Brooks.
By James L. Norris
Atty.

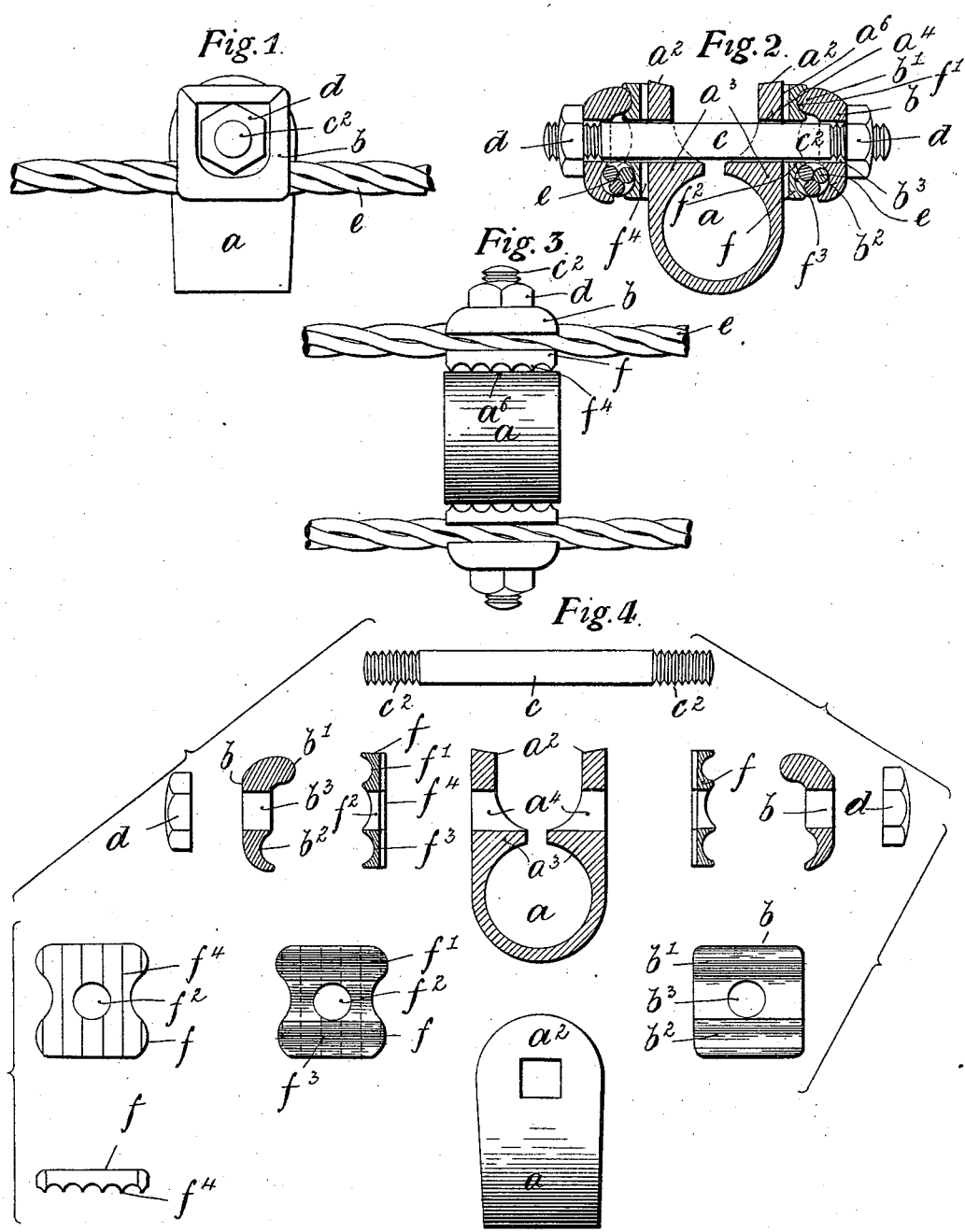

United States Patent Office.

JOHN BOULTBEE BROOKS, OF BIRMINGHAM, ENGLAND, ASSIGNOR TO THE J. B. BROOKS & COMPANY, LIMITED, OF SAME PLACE.

CYCLE-SADDLE ATTACHMENT-BOSS.

SPECIFICATION forming part of Letters Patent No. 575,631, dated January 19, 1897.

Application filed September 19, 1896. Serial No. 606,389. (No model.) Patented in England May 28, 1894, No. 10,235.

*To all whom it may concern:*

Be it known that I, JOHN BOULTBEE BROOKS, manufacturer, trading as J. B. Brooks & Co., a subject of the Queen of Great Britain, residing at Criterion Works, Great Charles Street, in the city of Birmingham, England, have invented certain new and useful Improvements in Cycle-Saddle Attachment-Bosses, of which the following is a specification, and for which I have obtained Letters Patent of Great Britain, bearing date May 28, 1894, and numbered 10,235.

This invention relates to detail improvements in attachment-bosses for securing cycle-saddles to their L pins or supports, and has for one of its objects a universally-adjustable boss.

Figure 1 of the accompanying drawings represents a side elevation of a universal boss constructed according to one form of my invention and applied to a wire saddle-supporting frame having single wires upon each side. Fig. 2 represents a cross-section of the same, but with the drawing-to bolt shown in elevation. Fig. 3 is an under side plan of the boss Fig. 1, showing the dispositions of the rods of the double-sided framing. Fig. 4 represents sections and elevations of the component parts of the boss separately. Fig. 5 represents the said boss, Fig. 1, applied to a four-wire framing or a framing in which each side has two wires. Fig. 6 represents a top side plan of my improvements applied to a pierced sheet-metal frame. Fig. 7 is a transverse vertical section of Fig. 6 with the drawing-up pin in elevation. Fig. 8 is a side elevation of a part of the framing and the boss.

In Figs. 1 to 4, $a$ is a nearly-all-round clip with the terminal and free ends $a^2$, formed with lugs $a^3$, having all-through holes $a^4$ through them, and with its outside facings $a^6$ being of soft metal.

$b$ are washer-lugs, each having a circular hole $b^3$ through it, a keep-groove $b^2$ sunken within its inner face, and a rest-lug $b'$ upon its upper inner part, which seats within one of the two keep-grooves $f'$ $f^3$, formed within the outer face of an interposed and rotating hardened-steel washer $f$, having a circular hole $f^2$ through its middle for taking onto the round outer part $c^2$ of a screw-ended square spindle $c$, and teeth or serrations $f^4$ upon its inner face. It will be observed that the said teeth run in directions at right angles to the direction of the keep-grooves.

After the spindle $c$ has been passed through the eyes $a^4$ of the clip and the components have been threaded in the proper relative order upon the round end of the spindle, with the frame wire or rod member $e$ lying between the keep-grooves $b^2$ $f^3$ of the washers $b$ and $f$, then by screwing home the nuts $d$ upon the screwed ends $c^3$ of the spindle $c$ the teeth $f^4$ are slightly embedded into the soft-metal faces $a^6$ of the clip $a$ and slightly close the branches $a^2$ thereof, while the frame-rods are drawn closer together and secured to the clip and the clip to the L or vertical seat-support in any desired position, hence a universal boss which admits of the saddle being tilted or adjusted, or of the eye of the clip being directed in any position suitable for taking either upon an L-pin or a vertical support.

In Fig. 5 the whole of the parts of this form of boss are the same as those of the one already described, other than that double keep-grooves $b^2$ $b^4$ are formed in the outer washers, and the rest-lugs $b'$ are dispensed with, so that the wires $e$ of the frame lie within the opposed keep-grooves of both the inside and outside washers.

If necessary, the cross-pin instead of being square may be made round and faceted upon one or both sides, or in order to fulfil the same function it may be made of any cross-section other than circular, and instead of employing nuts at both ends of the pin a solid head may be formed at one end.

Instead of employing outside washers $b$, the nuts or heads upon the ends of the drawing-up pin may fulfil the duty of both drawing up and clamping.

In Figs. 6, 7, and 8 the outside washers are dispensed with and the nuts or heads of the bolt are made to take the place of the outside washers and are sufficiently large to embrace the sides of the frame, while the interposed or inside washers are made stationary or fast with the frame by having keep-channels formed within their outer faces and hold the same function as the keep-grooves in the intermediate washers previously described.

$a$ is a nearly-all-round clip, with the terminal and free ends $a^2$, formed with lugs $a^3$, having all-through holes $a^4$ through them, and with its outside facings $a^6$ being preferably of soft metal.

$f$ are interposed or inside washers, each having a keep-channel $f'$, within which the sides $e$ of the double-sided frame lie, and also having a round hole $f^2$ through its middle for taking onto the outer part $c^2$ of a screw-ended square spindle $c$, and teeth or serrations $f^4$ upon its inner face, which teeth run, preferably, at right angles to the direction of the keep-channels and embed themselves into the soft metal of the faces $a^6$ of the clip on the screwing up of the nuts $d$, one of which may be fixed and form a head to the pin.

Having fully described my invention, what I desire to claim and secure by Letters Patent is—

1. In a cycle-saddle-securing attachment or boss, the combination of the spring-clip $a$ provided on the adjacent inner faces of its ends with lugs $a^3$, the pin or bolt $c$ fitted in sockets or holes $a^4$ formed in the ends of said clip, washers $f$ arranged on the ends of the pin in juxtaposition to the sides of the clip, outer washers $b$ arranged on said pin outside the washers $f$, registering grooves formed on the adjacent faces of said washers, and nuts for clamping the washers and the ends of the clip on said pin, substantially as described.

2. In cycle-saddle-securing attachments or bosses, the combination and arrangement of the spring-clip $a$, with the pin or bolt $c$, fitting into the sockets or holes $a^4$, the washers $f$, the outer washers $b$, the frame sides $e$, and the nuts $d$, all substantially as and for the purposes described and set forth.

3. In a cycle-saddle-securing attachment or boss, the combination of the spring-clip $a$, the pin or bolt $c$ fitted in sockets or holes $a^4$ formed in the ends of the clip, washers $f$ arranged on the ends of the pin and provided on their inner faces with teeth adapted to engage the outer faces of the clip and provided on their outer faces with keep-grooves for the reception of the frame sides, frame sides $e$ seated in said keep-grooves, and nuts arranged on the threaded ends of the pin, substantially as described and for the purpose specified.

In testimony whereof I have hereunto set my hand in presence of two subscribing witnesses.

JOHN BOULTBEE BROOKS.

Witnesses:
 ALBERT NEWEY,
 ARTHUR T. SADLER.